United States Patent [19]
Smith et al.

[11] Patent Number: 5,430,862
[45] Date of Patent: Jul. 4, 1995

[54] EMULATION OF CISC INSTRUCTIONS BY RISC INSTRUCTIONS USING TWO PIPELINED STAGES FOR OVERLAPPED CISC DECODING AND RISC EXECUTION

[75] Inventors: Steven S. Smith, Nashua, N.H.; Arnold J. Smith, Lawrence, Mass.; Amy E. Gilfeather, Charlestown, Mass.; Richard P. Brown, Acton, Mass.; Thomas F. Joyce, Westford, Mass.

[73] Assignee: Bull HN Information Systems Inc., Billerica, Mass.

[21] Appl. No.: 546,348

[22] Filed: Jun. 29, 1990

[51] Int. Cl.⁶ .................................. G06F 9/30
[52] U.S. Cl. .................................. 395/500; 395/375; 395/800; 364/231.8; 364/263; 364/DIG.1
[58] Field of Search ............. 395/375, 500, 800, 250

[56] References Cited

U.S. PATENT DOCUMENTS

| | | | |
|---|---|---|---|
| 3,766,532 | 10/1973 | Liebel, Jr. ................. | 395/775 |
| 4,307,445 | 12/1981 | Tredennick et al. ....... | 395/375 |
| 4,415,969 | 11/1983 | Bayliss et al. ............. | 364/200 |
| 4,447,874 | 5/1984 | Bradley et al. ............ | 395/650 |
| 4,514,803 | 4/1985 | Agnew et al. ............. | 364/200 |
| 4,587,612 | 5/1986 | Fisk et al. ................. | 364/200 |
| 4,633,417 | 12/1986 | Wilburn et al. ........... | 364/550 |
| 4,780,819 | 10/1988 | Kashiwagi ................. | 364/200 |
| 4,821,183 | 4/1989 | Hauris ....................... | 395/375 |
| 4,841,476 | 6/1989 | Mitchell et al. ........... | 395/500 |
| 4,862,407 | 8/1989 | Fette et al. ................ | 395/800 |
| 4,922,418 | 5/1990 | Dolecek .................... | 395/575 |
| 4,972,317 | 11/1990 | Buonomo et al. ......... | 364/200 |
| 4,989,178 | 1/1991 | Shonaka .................... | 395/500 |
| 4,992,934 | 2/1991 | Portanova et al. ........ | 364/200 |
| 5,003,468 | 3/1991 | Watanabe et al. ......... | 395/800 |
| 5,019,964 | 5/1991 | Yamamoto et al. ....... | 395/250 |
| 5,019,967 | 5/1991 | Wheeler et al. ........... | 395/775 |
| 5,046,190 | 9/1991 | Daniel et al. .............. | 382/49 |
| 5,293,592 | 3/1994 | Fu et al. .................... | 395/375 |

*Primary Examiner*—Ken S. Kim
*Attorney, Agent, or Firm*—Faith F. Driscoll; John S. Solakian

[57] ABSTRACT

The emulator includes first and second pipelined stages connected through a bidirectional bus for executing source instructions normally executed by a different-/source computer in a highly overlapped manner. The first stage includes an emulator chip which performs the function of fetching and decoding each source instruction stored in cache memory resulting in the generation of a number of vector addresses required for executing the instruction by the second stage. The second stage includes a high performance microprocessor chip having on-chip instruction and data caches for storing a plurality of emulation subroutines and data fetched during subroutine execution. In pipelined fashion, the emulator chip fetches and decodes each source instruction which generates a vector branch address which is loaded into the branch vector register while the microprocessor chip fetches and executes emulation subroutines specified by the vector address transferred via the bus for each previously decoded source instruction.

20 Claims, 5 Drawing Sheets

| | 0 | | | | | 31 |
|---|---|---|---|---|---|---|
| $0=R0: | ZERO SOURCE, NULL DESTINATION ||||||

$1-$7 = R1-R7: | SIGN (0-15) | DATA (16-31) |

$8 = W8: WORKING REGISTER (0-31)

$9-$15 = B1-B7: ADDRESS (0-29) | 0 (30) | 0 (31)

$16 = W9: WORKING REGISTER (0-31)

$17-$23 = K1-K7: DATA (0-31)

$24-$27 = W1-W3: WORKING REGISTER (0-31)

$28 = W4: 0010h (0-31)

$29 = W5: M6 (0-7) | M3 (8-15) | M2 (16-23) | CI (24-31)

$30 = W6: S (0-7) | (8-15) | M1 (16-23) | I (24-31)

$31 = W7: WORKING REGISTER (0-31)

SPECIAL REGISTER:
VR: 0010h (0-31)

Fig. 6.

```
;
;
; ADD $R5,=R2
;
          bvr.t    *    VR                    ; VECTOR TO THE ADDR5R2 SUB.
                                              ; (FROM END OF PREVIOUS INST.)
;
ADDR5R2:
          br            ADDR5                 ; GO TO THE ADDR5 SUBROUTINE
          or            R0,R2,W2              ; GET THE R2 DATA ADDR5:    xor           W2,R5,W1              ; ADD DATA MODULO 2
          addu          W2,R5,R5              ; ADD DATA
          xor           R5,W1,W1,             ; GET CARRY BITS
          or            FF5F#,R0,W3           ; GET THE MASK FOR I(OV) AND I(C)
          shra          W4,W3,W3              ; POSITION THE MASK
          and           W2,W6,W6              ; CLEAR I(OV) AND I(C)
          orh           0001#,R0,W7           ; GET CARRY SHIFT COUNT
          shr           W4,W7,W7
          shl           W7,W1,W2              ; SHIFT CARRY BITS
          orh           8000#,R0,W7           ; GET THE I(C) MASK
          shr           W4,W7,W7              ; ALIGN IT
          and           W7,W2,W2              ; GET I(C)
          xor           W2,W1,W1              ; COMPARE I(C) AND CARRY IN TO SIGN
          and           W7,W1,W1              ; GET I(OV)
          orh           000A#,R0,W7           ; GET THE I(C) ALIGNMENT SHIFT
          shr           W4,W7,W7              ; ALIGN THE SHIFT VALUE
          shl           W7,W2,W2              ; ALIGN I(C)
          or            W2,W6,W6              ; STORE I(C)
          btne          W1,R0,OVERFL          ; IF I(OV) = 0 CRACK NEXT INSTRUCTION
DONE:     bvr.t    *    VR                    ; BRANCH TO THE VECTOR IF UPDATED
          nop
          br            DONE                  ; OTHERWISE LOOP ;
OVERFL:   orh           0080#,R0,W7           ; GET MASK FOR I(OV)
          shr           W4,W7,W7              ; ALIGN THE MASK
          or            W7,W6,W6              ; SET I(OV)
          shl           W4,R5,R5              ; SHIFT R5 (0) TO MSB
          orh           0400#,R0,W7           ; GET THE MASK FOR M1 (T5)
          shr           W4,W7,W7              ; ALIGN THE MASK
          and           W7,W1,W1              ; GET M1 (T5)
          bte           W1,R0,DONE            ; IF M1 (T5) = 0 DONE
          shra          W4,R5,R5              ; SIGN EXTEND R5
;
          br            TV06                  ; JUMP TO OVERFLOW TRAP
          XXX                                 ; FIRST OVERFLOW TRAP INSTRUCTION

*    bvr.t REPRESENTS THE "NEW" INSTRUCTION WHICH IS A BRANCH TO VECTOR IF THE
     VECTOR REGISTER HAS BEEN UPDATED.
```

Fig. 7.

EMULATION OF CISC INSTRUCTIONS BY RISC INSTRUCTIONS USING TWO PIPELINED STAGES FOR OVERLAPPED CISC DECODING AND RISC EXECUTION

BACKGROUND OF THE INVENTION

1. Field of Use

The present invention relates to systems which execute complex instruction sets and more particularly to computers which emulate the operations of other computers.

2. Prior Art

There are a number of systems designed to simulate or emulate the operations of a different type of computer (source computer). In certain cases, this has involved the use of separate translating programs to convert the source computer programs into a form executable by the emulating or simulating computer. This approach has proved time consuming and inefficient.

To overcome the above disadvantages, one solution has been to provide a general purpose computer which includes a simulative interpretative capability enabling the computer to reference subroutines for executing source computer instructions. This arrangement is disclosed in U.S. Pat. No. 3,698,007 which issued on Oct. 10, 1972.

Another proposed approach has been to design the architecture of a computer specifically for efficient execution of source program instructions. It has been recognized that this approach requires a substantial investment in terms of cost and resources. Moreover, with continued rapid improvements in computer technology, such investments must be ongoing in order to remain product competitive.

Accordingly, it is primary object of the present invention to provide a high performance computer system which is capable of emulating the complex instruction set of a general purpose computer system.

It is a further object of the present invention to provide a high performance computer system which uses commercial or existing computer technology.

SUMMARY OF THE INVENTION

The above and other objects of the present invention are achieved in a preferred embodiment of an emulator which includes two pipelined stages interconnected for communication through a bidirectional bus. The first stage includes an emulation (E) chip which couples to an instruction cache unit. The E chip operates to fetch from the instruction cache, program instructions executable by a general purpose computer (source computer). The E chip decodes each source instruction and generates a number of vector branch addresses required by the second pipeline stage for executing the source instruction.

The second stage includes a high performance microprocessor chip having on-chip instruction and data caches for storing a plurality of emulation subroutines and any data fetched during the execution of the subroutines.

In accordance with the present invention, in a pipelined fashion, the E chip fetches, decodes source instructions and generates the required vector branch addresses in parallel with the microprocessor chip's execution of the emulation subroutines specified by the vector addresses transferred via the bus. In the preferred embodiment, the microprocessor chip further includes a dedicated register which couples to the bus and is used to store each vector branch address generated by the E chip and loaded therein during microprocessor operation. Each time the microprocessor chip accesses or reads the address contents of the branch vector register in response to a branch on vector register instruction contained within one of the emulation subroutines being executed, this is signaled to the E chip through the bus. This causes the E chip to load a next vector address into the register while the microprocessor executes the emulation subroutine designated by the previously loaded vector address.

This facility, which is the referenced related patent application, reduces the need for having the microprocessor chip make any off-chip accesses in fetching emulation subroutines which substantially increases performance. This is particularly important when the microprocessor chip is a reduced instruction chip (RISC) which is the case for the preferred embodiment. For reasons of high performance and commercial availability, a RISC chip which includes a tightly coupled or on-chip data and instruction caches was selected for implementing the second pipeline stage.

The novel features which are believed to be characteristic of the invention, both as to its organization and method of operation, together with further objects and advantages of the present invention, will be better understood from the following detailed description taken in conjunction with the accompanying drawings.

DETAILED DESCRIPTION OF THE PREFERRED EMBODIMENT

Figure 1:
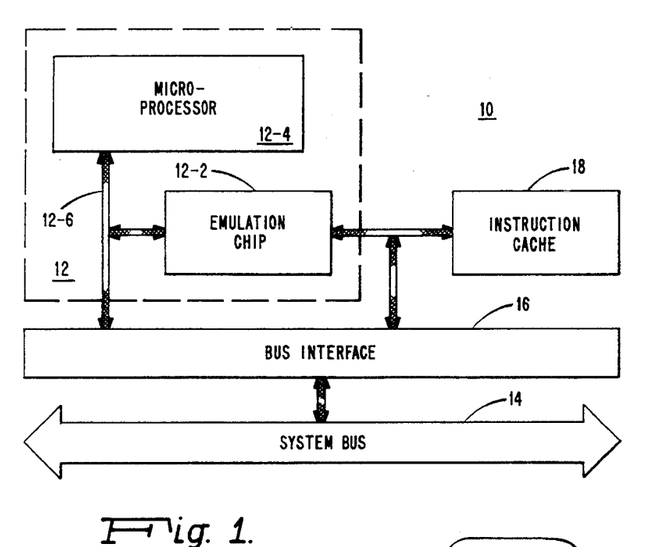
FIG. 1 is a block diagram of a system which includes the two stage pipelined emulator of the preferred embodiment of the present invention.

FIG. 1 shows in block diagram form, a data processing system 10. As shown, the system 10 includes an emulator 12 which couples to a system bus 14 through a bus interface unit 16 and to an instruction cache 18. The emulator 12 includes two pipeline stages which correspond to an emulation chip 12-2 and a microprocessor chip 12-4. The chips 12-2 and 12-4 are interconnected to communicate through a bidirectional bus 12-6 which also provides a main memory access path through bus interface unit 16 and system bus 14.

The E chip 12-2 performs three main functions. It fetches source instructions executable by a general purpose computer from instruction cache 18, cracks or decodes each instruction and, based upon the result of such decoding, generates a number of branch vector addresses which specify the corresponding emulation subroutines for executing each source instruction. Thus, the E chip 12-2 may include hardware similar to an instruction or I chip such as that described in the copending patent application of Deborah K. Staplin and Jian-Kuo Shen titled, "Instruction Unit Logic Management Apparatus Included in a Pipelined Processing Unit", Ser. No. 07/374,881, filed on Jun. 30, 1989 and assigned to the same assignee as named herein.

The microprocessor 12-4 performs the main function of executing the required emulation subroutines specified by the vector branch addresses generated by E chip 12-2 and storing the results and other information which is the same as that stored by the general purpose computer being emulated during its execution of source instructions. In the preferred embodiment, the microprocessor 12-4 takes the form of a high performance reduced instruction set (RISC) microprocessor chip which includes on-chip instruction and data caches for minimizing access delays. For example, one such chip is the Intel i860 microprocessor.

In the preferred embodiment, the emulator 12 is used to emulate the complex instruction set of the DPS6000 computer system manufactured by Bull HN Information Systems Inc. The source instruction set has several categories of instructions. These include a general or basic instruction set; an extended integer (EII) instruction set; a commercial instruction set; and a scientific instruction set. The DPS6000 computer has an architecture which includes both 16, 32 and 64-bit registers, mode and indicator registers and trap handler facilities. For a further description of the types of instructions and architecture, reference may be made to U.S. Pat. No. 4,638,450, in addition to the referenced copending patent application.

Figure 2:
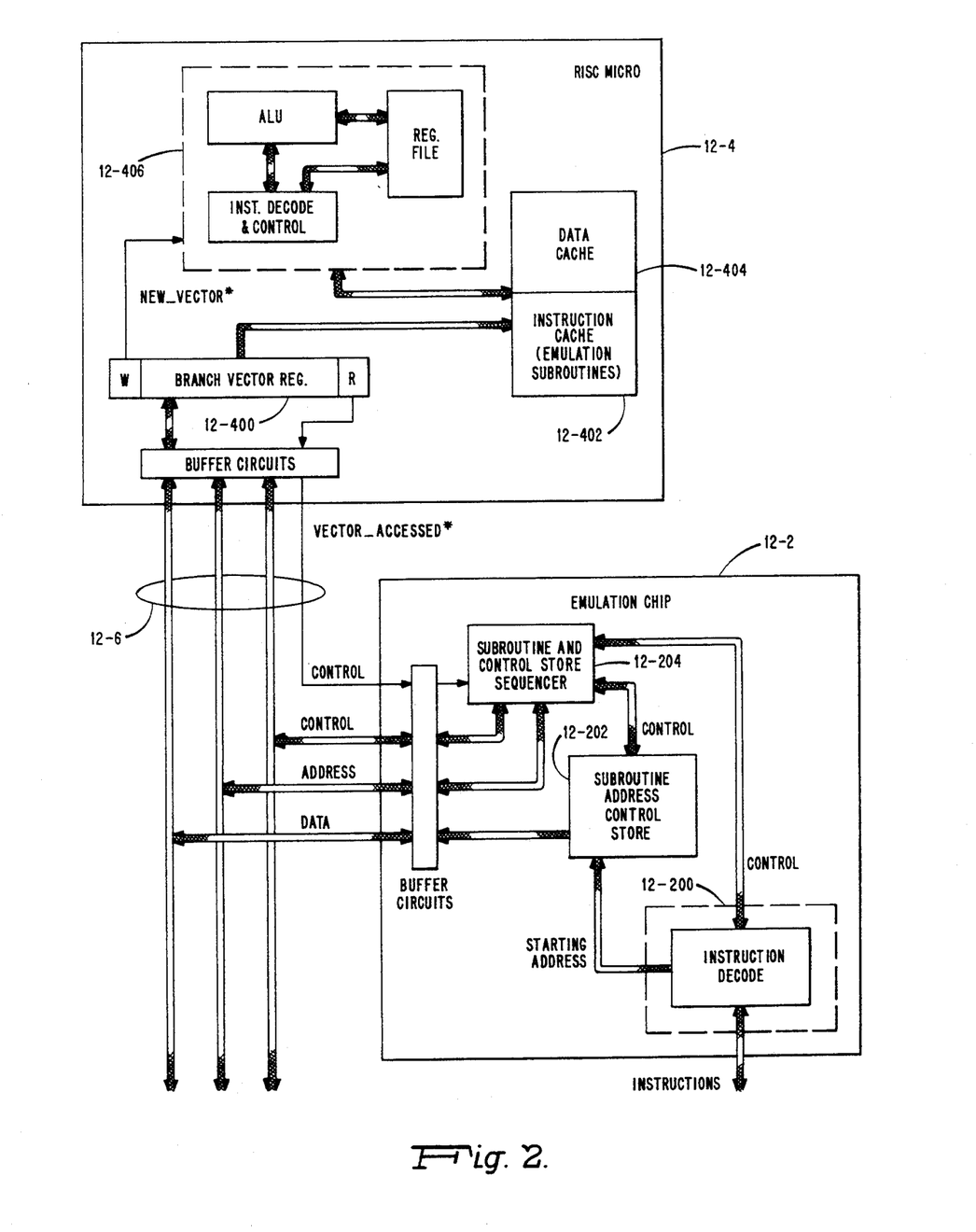
FIG. 2 shows in greater detail, the different stages of the emulator of FIG. 1.

FIG. 2 shows in greater detail, the organizations of E chip 12-2 and microprocessor chip 12-4. As shown, the E chip 12-2 includes an instruction decode unit 12-200 such as above mentioned I chip. It also includes a subroutine address control store 12-202 and subroutine and sequencer unit 12-204 which interconnect as shown.

As previously mentioned, the unit 12-200 operates to fetch and decode each source instruction which results in the development of a starting address which is applied as an input to subroutine address control store 12-202, as shown. In the simplest case, this starting address may correspond to the op-code bits of the source instruction. The store 12-202 includes locations for storing microinstructions required for performing the required functions of E chip 12-2. Each location contains a microinstruction word having op-code control store address and vector address fields. The different vector branch addresses identify the emulation subroutines for executing the different instructions of the complex instruction set of the general purpose computer being emulated. In certain instances, control store 12-202 uses pairs of locations for storing vector branch addresses specifying emulation subroutines for performing the address development and execution portions of certain source instructions.

The subroutine and control store sequencer 12-204 includes the logic circuits for generating the necessary control signals for conditioning or advancing control store 12-202 and instruction decode unit 12-200 as required for processing source instructions fetched from instruction cache 18. As seen from FIG. 2, the control store 12-202 and subroutine and control store sequencer 12-204 connect in common to the control, address and data lines of bidirectional bus 12-6.

The bus 12-6 is operated according to a predefined protocol or dialog for transferring commands, address and data between chips 12-2 and 12-4, in addition to system bus 14. Transfers are synchronized through the use of a common clock connected to the input/output interfaces of both chips. The bus 12-6 provides a facility by which E chip 12-2 can write and read the contents of internal registers of chip 12-4 which connect to bus 12-6. This is done through the use of read and write port commands. For an example of this type of bus arrangement, reference may be made to U.S. Pat. No. 4,910,666 which issued on Mar. 20, 1990.

As seen from FIG. 2, microprocessor chip 12-4 includes a 32-bit branch vector register 12-400 which connects to bus 12-6 so as to be capable of being read and written by E chip 12-2. Additionally, the register 12-400 operatively connects to an instruction cache 12-402. Register 12-400 has associated therewith read and write indicators which are set to appropriate states for signaling when a read or write has taken place within register 12-400.

As explained herein, the read indicator is set to an active state by the RISC chip 12-4 in the same way any conventional indicator bit is set in response to accessing the contents of a register or register file. The output from the read indicator of register 12-400 is used to generate an external vector accessed signal which is applied via bus 12-6 as an input to the E chip subroutine and control store sequencer 12-204, as shown. The write indicator is set in response to a bus write strobe signal applied via bus 12-6 when the register is written into by the E chip.

Instruction cache 12-402 is of a size for storing the most frequently used emulation subroutines required for executing the instruction set of the emulated general purpose computer.

Microprocessor chip 12-4 also includes an 8 kbyte data cache 12-404 for storing data and other information fetched in response to the instructions of an emulation subroutine. Microprocessor chip 12-4 further includes a register file, an arithmetic and logic unit and an instruction decode and control unit connected as shown which form part of a RISC core block 12-406.

For further information regarding the construction of a microprocessor which is similar to the microprocessor chip 12-4, reference may be made to the article titled, "Introducing the Intel i860 64-Bit Microprocessor", published in the August, 1989 issue of IEEE MICRO.

DESCRIPTION OF OPERATION

Figure 5:
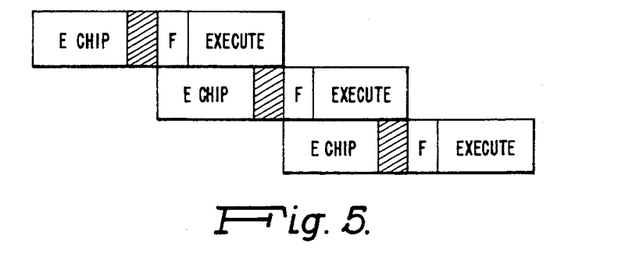
FIG. 5 illustrates the overlapped pipelined operation of the emulator of FIG. 1.

With reference to FIGS. 1 and 2, the operation of the emulator 12 of the preferred embodiment will now be described in both general and specific terms. FIG. 5 illustrates in general, the pipelined operation of the E chip 12-2 and the RISC microprocessor chip 12-4 of emulator 12 in executing source instructions read from instruction cache 18.

As shown, the E chip 12-2 performs the instruction decode and develops the vector address which corresponds to the starting address of the emulation subroutine to be executed by RISC microprocessor chip 12-4. In parallel, the RISC chip 12-4 performs a fetch of the emulation subroutine address such as by reading the contents of the vector branch register 12-400 and then executes the specified emulation subroutines fetched from instruction cache 12-402 emulating the functionality of the source computer in executing the corresponding source instruction.

Figure 3:
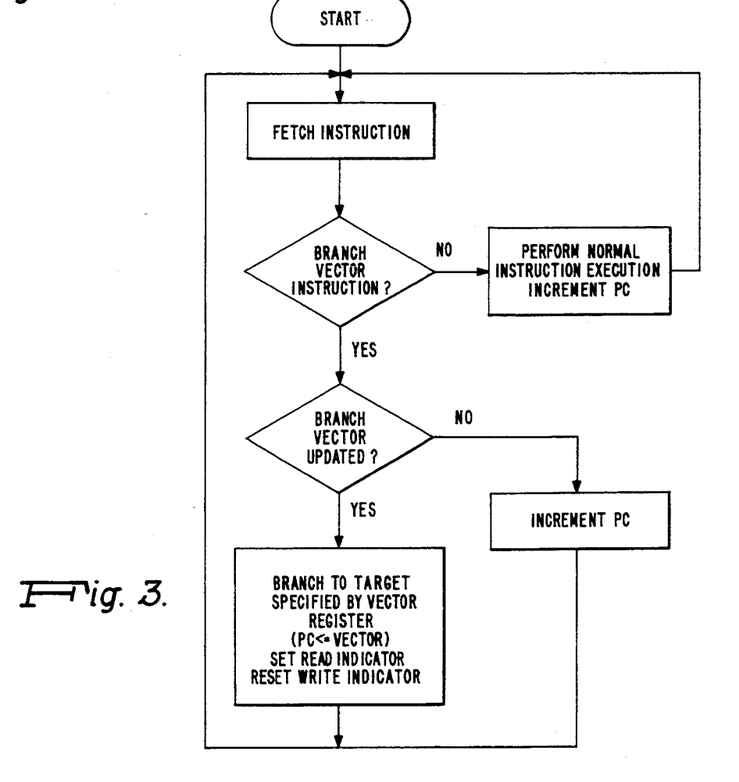
FIG. 3 is a flow diagram used to illustrate the branch vector mechanism which is included in the emulator of FIG. 1.

Important to the above operations is that by including a minimum amount of additional hardware in chip 12-4, the above described operations are able to proceed without having the RISC chip 12-4 fetch vector addresses for the emulation subroutines from off-chip. The additional hardware includes dedicated vector register 12-400 and a branch mechanism for executing a branch operation for determining if the contents of the register 12-400 have been updated. FIG. 3 illustrates the operation of this mechanism in executing a branch vector instruction. This mechanism is subject of the referenced related patent application which describes the operation of mechanism in greater detail.

Referring to FIG. 3, it is seen that each time RISC chip 12-4 fetches an instruction of an emulation subroutine, it decodes the instruction. When the instruction is not a branch vector instruction, chip 12-4 executes the instruction and increments its program counter by one for fetching the next instruction. When the instruction is a branch vector instruction, chip 12-4 tests the contents of the vector register to determine if it had been updated. As mentioned previously, this is done by testing the state of the associated write indicator to determine if the register has been written or updated by E chip 12-2.

If the register contents have not been updated (i.e., the write indicator is still a ZERO), chip 12-4 increments its program counter and fetches the next instruction. If the register contents have been updated, chip 12-4 branches to the emulation subroutine specified by the contents of the vector register by loading the contents into its program counter as shown in FIG. 3. In this manner, the chip 12-4 does not have to perform any off-chip accesses for vector branch values, thereby reducing the time of instruction processing.

Before describing the operation of the emulator 12 in more specific terms, reference will be made to FIG. 6. As mentioned previously, the figure shows the usage of the different registers within the 32-bit register set of the RISC chip 12-4 to store data, indicator and mode information specific to the emulated general purpose computer.

Figure 6:
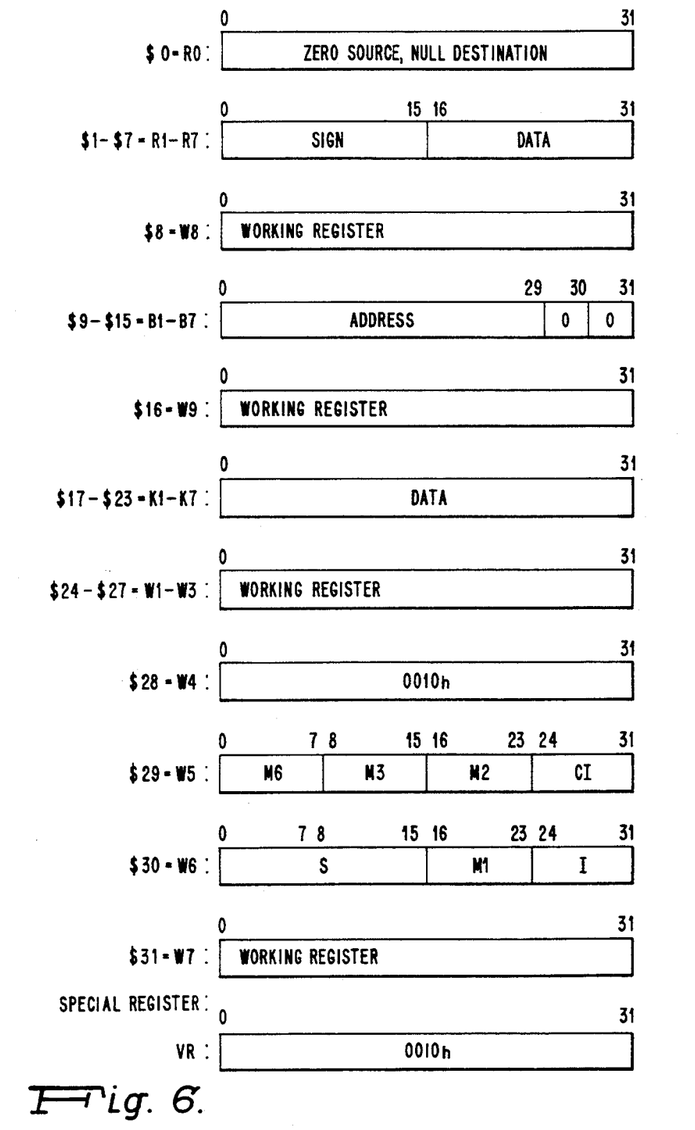
FIG. 6 illustrates in greater detail the internal registers of one stage of the emulator of FIG. 2.

As seen from FIG. 6, register R0 stores an all ZEROS value and is used for performing clearing operations. Registers $1–$7 are used for storing operand sign and data information in the format shown stored in registers R1–R7 of the emulated computer. Register $8 is used as working register W8.

Registers $9–$15 are used to store address values stored in the B1–B7 registers of the emulated computer. Register $16 is used as a working register W9. Data which is stored in the K1–K7 registers of the emulated computer is stored in registers $17–$23. Registers $23–$27 are assigned to store information which is stored in working registers W1–W3. The register $28 is used for storing a constant value 0010h for shifting 16 bits and serves as working register W4.

The registers $29 and $30 are used as working registers W5 and W6 for storing mode indicator, commercial, scientific and basic indicator information stored in the emulated computer. Register $31 is used as working register W7. The VR register 12-400 described previously is used for storing a 32-bit branch vector address value.

First, the emulator 12 is initialized. When initialized, the E chip 12-2 is set to store a starting address which points to the first emulated computer instruction to be fetched and executed by the emulator 12. Also, the emulation subroutines required to emulate the operation of the general purpose computer will have been loaded into the instruction cache 12-402. Included as part of the emulation subroutines, are the emulation subroutines for the Add R5,R2 instruction shown in FIG. 7.

It is assumed that the emulator 12 has been executing instructions and at some point encounters the ADD R5,R2 instruction. The branch vector register 12-400 is loaded in response to the bvr.t instruction of FIG. 7. At this point, the register 12-400 contains the vector address to the start of the ADD R5,R2 emulation subroutine.

Figure 4A:
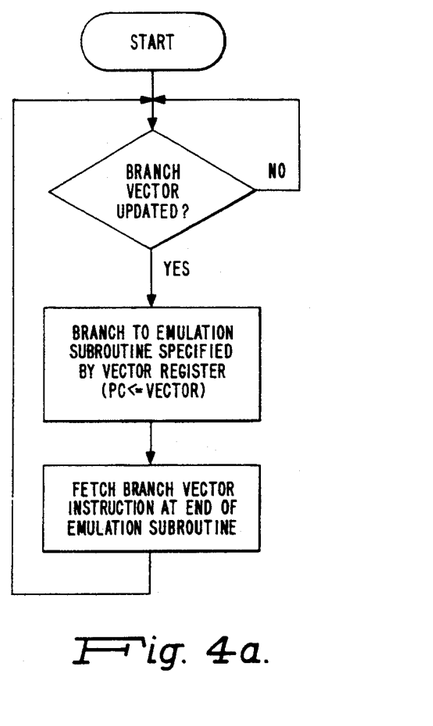
FIGS. 4a and 4b are each flow diagrams used to explain the operation of the emulator of FIG. 1.

It will be appreciated that at the point where the source instruction execution starts, the vector address may or may not have been loaded. That is, the bvr.t and subsequent instructions may cause chip 12-4 either to time-out or to continue in a loop until the vector register 12-400 has been loaded. This operation is illustrated by the flow diagram of FIG. 4a. That is, as shown in FIG. 4a, if the vector address contents have been updated as indicated by the setting of the write indicator, then microprocessor chip 12-4 sequences through the yes path and begins executing the ADD R5 emulation subroutine, as shown. If it has not been updated, then the chip 12-4 continues to loop.

Figure 4B:
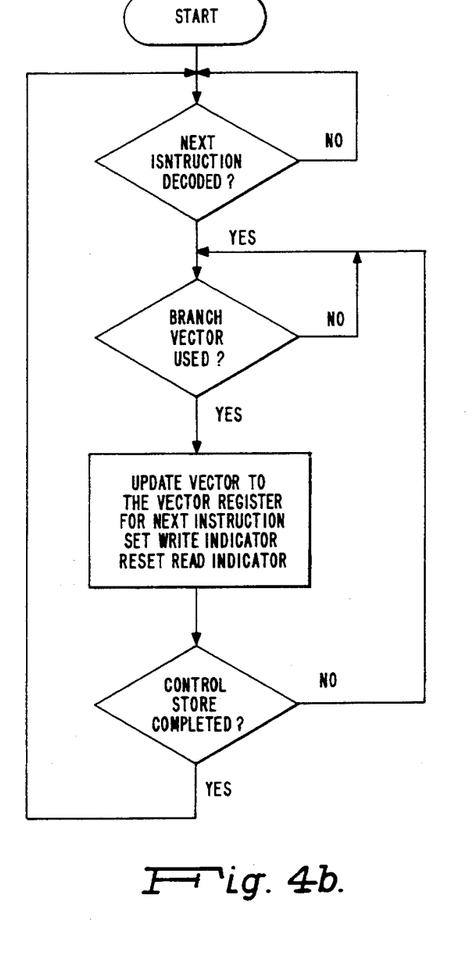

For each source instruction, there may be two source addresses, one for address development and the other for execution. These vector addresses would be loaded into register 12-400 in sequence. The second address would be loaded from the next control store location upon receipt of a vector accessed signal specified from the prior decoding of the source instruction just as in the case of the first vector address as shown in FIG. 4b.

For certain types of source instructions, such as a conditional branch instruction, it is desirable that the RISC chip 12-4 have the capability to interrogate/request the E chip 12-2 to obtain the other vector address for the branch path. Every time the RISC chip 12-4 selects the emulation subroutine for a source branch instruction, it can calculate the taken branch address ahead of time and store it in a register within the E chip 12-2. The RISC chip 12-4 can then request the branch vector address value from E chip 12-2 via bus 12-6. It will then be used in conjunction with a normal branch vector instruction to fetch the specified emulation subroutine.

In each of the above cases, when the contents of the branch vector register 12-400 is updated or written by either the E chip 12-2 or RISC chip 12-4, the write indicator will be set to an active or binary ONE state. As mentioned, in the case of the ADD instruction, the RISC chip 12-4 executes the bvr.t instruction which results starting the execution of the emulation subroutine for carrying out the ADD source instruction. The source ADD instruction being executed requires no address development. However, if address development was required, the address development emulation subroutine would have loaded working register W2 prior branching address ADDR5 (ADDR5 instruction subroutine entry point).

Figure 7:
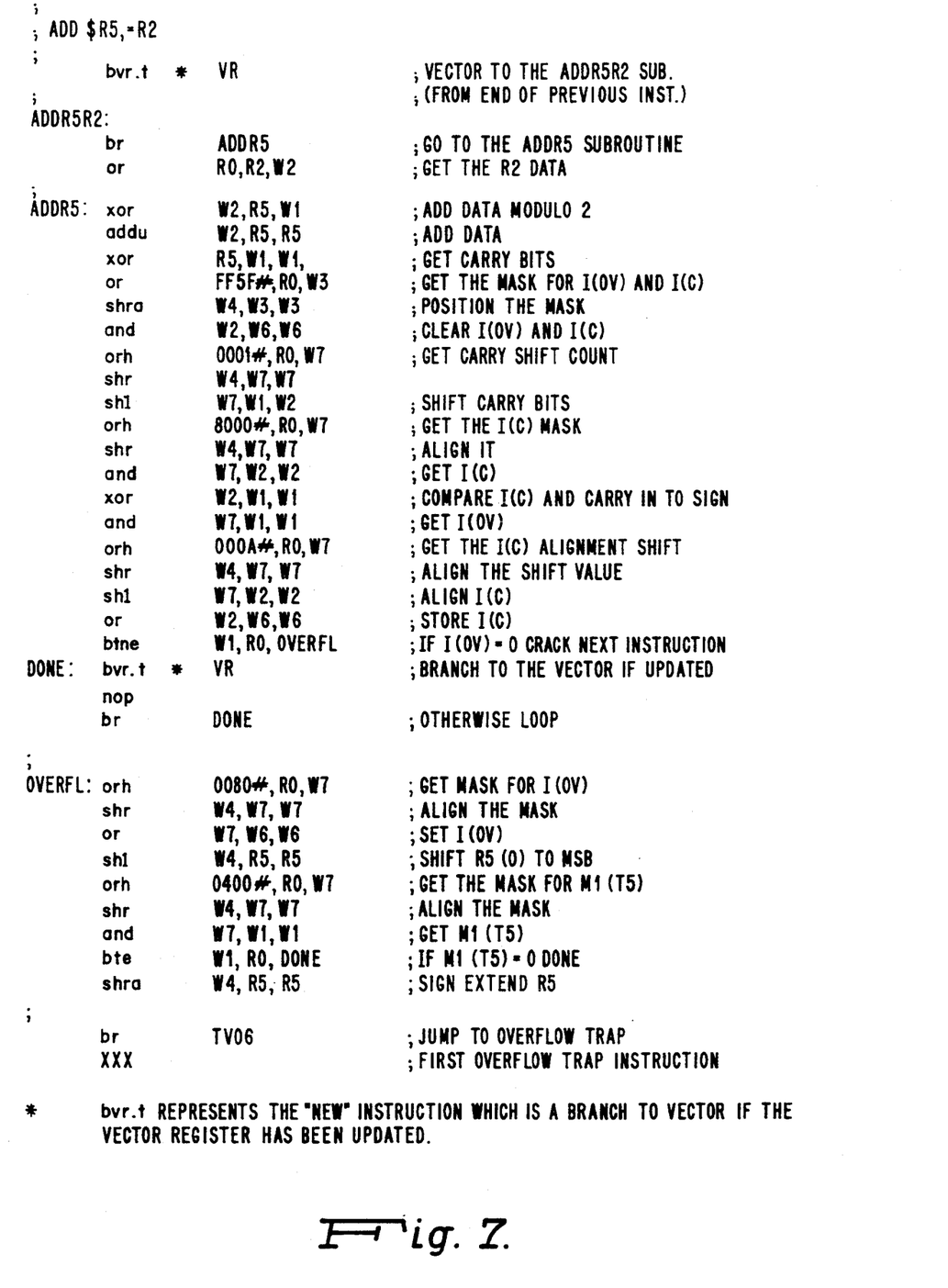
FIG. 7 illustrates representative set of emulation subroutines used in describing the operation of the emulator of the present invention.

As seen from FIG. 7, there are a substantial number of RISC instructions required to perform the addition. However, each of these instructions is rapidly executed within a single cycle of operation. The ADD source instruction specifies adding the 16-bit contents of the register R5 to the contents of register R2 and storing the result and any overflow condition respectively into register R5 and an overflow I indicator register. The RISC instructions cause chip 12-4 to perform the addition of a 16-bit register in a 32-bit register field and store any bits carried into the high order field of the register in the corresponding I section of register W6 of FIG. 6. The majority of the RISC instructions are used for aligning, shifting, etc. register contents to match up the bits within the desired register sections.

In greater detail, first, the RISC chip 12-4 executes the OR instruction of FIG. 7. This ORs the contents of register R0 (i.e., ZEROS) with the contents of register R2 and store the result (i.e., contents of R2) in working location W2. The rest of the subroutine instructions acts on the contents of working register W2 to add the contents to the contents of working register W5 (i.e., unsigned add). The orh instruction uses a constant value of FF5F to move the result to the upper 16-bit positions and ORs it with the contents of register R0 (all ZEROS). This stores the mask for masking off the carry and overflow bits.

Next, the high order bits are shifted down so that they will mask off the appropriate bits. The shift right arithmetic instruction puts in the sign bits. The AND instruction clears out the bits in the indicator section of working register W6. That is, first it clears out the bits from the addition, takes the bits from the addition and masks them back into the I section of the register W6.

The remaining instructions of the emulation subroutine are used to fetch mask values required for completing the operation. The btne instruction tests the state of the overflow bit position in the W1 register. If there is an overflow (W1/=R0), the microprocessor chip 12-4 branches to the OVERFO emulation subroutine which is used to test if there is a trap on overflow condition specified. Also, chip 12-4 stores the state of the OVF bit in the I section of the register W6. This involves testing the state of a predetermined mode bit which corresponds to M1(T5). If a trap condition is indicated by the state of the mode bit, chip 12-4 branches to the trap handler emulation subroutine TVO6.

If there is branch to the TV06 subroutine, chip 12-4 saves the source computer location of the source instruction being executed which in this example is the address of the ADD R5 instruction. Also, the TVO6 emulation subroutine will execute certain overhead tasks such as storing away the address of the source computer instruction trapped on and calculating what address the trap handler is at and save away these registers and indicators. The last instruction of the TV06 emulation subroutine executed by RISC chip 12-4 causes the E chip 12-2 to fetch the first instruction of the emulated computer overflow trap handler.

If no trap is indicated, chip 12-4 executes a br instruction branching it back to the DONE emulation subroutine for fetching the next instruction corresponding to the f part of the next RISC microprocessor's execution cycle shown in FIG. 5. If the branch vector register 12-400 has not been updated, the loop at DONE is executed until the register is updated.

From the above, it is seen how the emulator of the present invention is able to emulate the operation of a general purpose computer having specific architectural features in executing instructions. The emulator achieves high performance by using a two-stage pipeline and a state of the art high performance commercial RISC microprocessor chip. Even though a substantial number of RISC instructions are required to execute one source instruction, it is possible to execute such instructions at a very high rate.

It will be appreciated that it is possible to modify the algorithm or type of RISC instructions included in the emulation subroutines to better optimize them specifically for the architecture of the microprocessor chip. While the i860 chip was indicated for implementing chip 12-4, it was selected because of it having on-chip instruction and data caches. It will be obvious that other high performance chips could also be used, such as the R3000 and successor chips manufactured by MIPS Corporation.

It will be obvious to those skilled in the art that many changes may be made to the preferred embodiment of the present invention without departing from its teachings. For example, different chips and different instruction sets may be used. Other changes will be readily apparent to those skilled in the art.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. A pipelined emulator for executing a set of source instructions executable by a general purpose computer having a specific architecture, said emulator comprising:

a first pipelined stage coupled to an instruction cache, said first pipelined stage including an emulation chip for fetching and for decoding each source instruction stored in said instruction cache for generating a number of vector addresses for identifying a corresponding number of emulation subroutines required for executing said each source instruction;

a second pipelined stage, said second stage including a high performance microprocessor chip and instruction and data caches tightly coupled to said microprocessor chip, said instruction cache of said second stage storing a plurality of emulation subroutines for executing said set of source instructions, each emulation subroutine containing a plurality of reduced instruction set (RISC) type of instructions and said data cache of said second stage for storing data fetched during execution of said emulation subroutines; and, a bidirectional bus interconnecting said first and second pipelined stages for transfer and storage of each of said number of vector addresses between said first and second pipelined stages, the transfer of each vector address occurring as soon as storage is made available, said emulation chip decoding each source instruction and generating said number of vector addresses in parallel with said microprocessor chip fetching and executing RISC instructions of those emulator subroutines stored in said instruction cache of said second stage specified by the number of vector addresses generated for a previously decoded source instruction by said emulator chip and transferred through said bidirectional bus for emulating said general purpose computer in executing said each source instruction.

2. The emulator of claim 1 wherein said microprocessor chip includes branch vector apparatus, said apparatus being connected to said bidirectional bus for receiving and storing each vector address generated and transferred by said emulation chip and said apparatus including output means for generating an external signal on said bus signaling each time said microprocessor chip accesses said each vector address to fetch one of said emulation subroutines from said instruction cache, enabling said emulation chip to transfer a next vector address to said branch vector apparatus thereby eliminating said second pipeline stage having to make off chip accesses.

3. The emulator of claim 2 wherein said branch vector apparatus further includes a branch vector register connected to said bus for receiving and storing said each vector address, read and write indicator means for storing signals received from said microprocessor and emulation chips indicating when said branch vector register has been accessed and updated respectively; and means for connecting said read indicator means to said output means for causing said output means to generate said external signal on said bus each time said read indicator means is set to an active state.

4. The emulator of claim 3 wherein said microprocessor chip includes a branch vector instruction facility for testing said write indicator means for determining when said write indicator means is set to an active state enabling said microprocessor chip to branch to one of said plurality of emulator subroutines stored in said instruction cache.

5. A pipelined emulator for executing a set of source instructions executable by a general purpose computer having a specific architecture, said emulator comprising:

a first pipelined stage coupled to an instruction cache, said first pipelined stage including an emulation chip for fetching and for decoding each source instruction stored in said instruction cache for generating a number of vector addresses for identifying a corresponding number of emulation subroutines required for executing said each source instruction;

a second pipelined stage, said second pipelined stage including a high performance microprocessor chip and instruction and data caches tightly coupled to said microprocessor chip, said instruction cache of said second stage storing a plurality of emulation subroutines for executing said set of source instructions, each of said plurality of subroutines including a plurality of reduced instruction set (RISC) type of instructions and a branch vector instruction as a last one of said plurality of RISC type of instructions coded for fetching a next emulation subroutine and said data cache of said second stage for storing data fetched during execution of said RISC type of instructions of said emulation subroutines; and, a bidirectional bus interconnecting said first and second pipeline stages for transfer of said number of vector addresses between said first and second pipelined stages, said emulation chip decoding each source instruction and generating said number of vector addresses for said each source instruction in parallel with said microprocessor chip fetching and executing RISC type instructions of those emulation subroutines stored in said instruction cache of said second stage specified by the number of vector addresses generated by said emulator chip for a previously decoded source instruction by said emulator chip and transferred through said bidirectional bus for emulating said general purpose computer in executing said each source instruction, said microprocessor chip having;

branch vector apparatus connected to said bidirectional bus, said branch vector apparatus including a branch vector register connected to said bus for receiving and storing said each vector address, read and write indicator means for storing signals received from said microprocessor and emulation chips for indicating when said branch vector register has been accessed and updated respectively, output means for generating an external signal on said bus signaling each time said microprocessor chip accesses said each vector address to fetch one of said emulation subroutines from said instruction cache, and means for connecting said read indicator means to said output means for causing said output means to generate said external signal on said bus each time said read indicator means is set to an active state; and, a branch vector instruction facility for testing said write indicator means for determining when said write indicator means has been set to said active state by said branch vector instruction for enabling said microprocessor chip to fetch said RISC type instructions of the next emulation subroutine from said instruction cache.

6. The emulator of claim 5 wherein said instruction and data caches are located on said microprocessor chip and said microprocessor chip is a standard reduced instruction set (RISC) type chip.

7. The emulator of claim 3 wherein said emulation chip includes a subroutine and control store sequencer coupled to a subroutine address control store and an instruction decode unit, said instruction decode unit being coupled to said instruction cache and in response to fetching and decoding said each source instruction, said decode unit generating a starting address for accessing said subroutine address control store, said subroutine address control store having a plurality of addressable storage locations for storing microinstructions for controlling emulation chip operations, each of a number of said microinstructions containing a vector address for specifying a starting address of a different one of said plurality of emulation subroutines and said subroutine address control store being connected to said bus, said control store in response to said starting address reading out a specified one of said number of said microinstructions for generating one of said number of vector addresses for transfer to said microprocessor chip.

8. The emulator of claim 7 wherein said subroutine and control store sequencer is connected to said output means of said microprocessor chip, said sequencer in response to each external signal advancing said subroutine address control store to access a microinstruction for reading out another one of said number of said microinstructions for generating a next one of said number of vector addresses for transfer to said microprocessor chip.

9. The emulator of claim 8 wherein said number of said microinstructions include vector addresses for specifying emulation subroutines executed by said microprocessor chip for performing address development and execution phases of operation required for emulating execution of source instructions by said general purpose computer.

10. The emulator of claim 1 wherein said first stage includes register storage means coupled to said bidirectional bus for storing a branch address generated and transferred by said second stage to said first stage in response to a predetermined type of source instruction, said first stage in response to signals subsequently received from said second stage requesting said branch address, transferring said branch address to said second stage for fetching a specified one of said emulation subroutines for executing said predetermined type of source instruction.

11. A pipelined emulator for executing source instructions executable by a general purpose computer, said emulator comprising:

a microprocessor chip stage including on-chip instruction and data caches, said on-chip instruction cache storing a plurality of emulation subroutines for said source instructions, each emulation subroutine containing a number of RISC instructions;

an emulation chip stage coupled to an instruction cache for storing a plurality of source instructions of a program to be emulated by said emulator, said emulation chip stage including:

an instruction unit coupled to said instruction cache for fetching and decoding each source instruction and a subroutine address control store coupled to said instruction unit, said store including a plurality of locations, each for storing a vector address identifying a different one of said plurality of emulation subroutines; and, a bidirectional bus interconnecting said microprocessor and emulation chip stages for transferring information according to a standard protocol, said emulation instruction unit during a first phase of operation, decoding each source instruction fetched from said instruction cache and in accordance with said decoding causing said control store to read out said vector address for transfer and storage in said microprocessor chip stage using said standard protocol, said transfer occurring as soon as storage is made available and during a second phase of operation, said microprocessor chip stage fetching said vector address previously transferred to said microprocessor chip stage during said first phase and executing said number of RISC instructions of a specified one of said emulation subroutines designated by said vector address, said executing of RISC instructions overlapping said emulation chip stage decoding of a next source instruction, said read out of said vector address and said transfer to said microprocessor chip stage thereby enabling the execution of source instructions in a two-stage overlapped pipelined mode of operation.

12. The emulator of claim 11 wherein said microprocessor chip includes branch vector apparatus, said apparatus being connected to said bidirectional bus for receiving and storing each vector address generated and transferred by said emulation chip and said apparatus including output means for generating an external signal on said bus signaling each time said microprocessor chip accesses said each vector address to fetch one of said emulation subroutines from said instruction cache, enabling said emulation chip to transfer a next vector address to said branch vector apparatus thereby eliminating said microprocessor chip having to make off chip accesses.

13. The emulator of claim 11 wherein said branch vector apparatus further includes a branch vector register connected to said bus for receiving and storing said each vector address, read and write indicator means for storing signals received from said microprocessor and emulation chips indicating when said branch vector register has been accessed and updated respectively; and means for connecting said read indicator means to said output means for causing said output means to generate said external signal each time said read indicator means is set to an active state.

14. The emulator of claim 13 wherein said microprocessor chip includes a branch vector instruction facility for testing said write indicator means for determining when said write indicator means is set to an active state enabling said microprocessor chip to branch to one of said plurality of emulator subroutines stored in said instruction cache.

15. A pipelined emulator for executing a set of source instructions executable by a general purpose computer, said emulator comprising:

a microprocessor chip stage including on-chip instruction and data, said on-chip instruction cache storing a plurality of emulation subroutines for executing said set of source instructions, each of said plurality of subroutines including a plurality of reduced instruction set (RISC) type of instructions and a branch vector instruction as a last one of said plurality of RISC type of instructions coded for fetching a next emulation subroutine;

an emulation chip stage coupled to an instruction cache for storing a plurality source instructions of a program to be emulated by said emulator, said emulator stage including an instruction unit coupled to said instruction cache for fetching and decoding each source instruction and a subroutine address control store coupled to said instruction unit, said store including a plurality of locations, each for storing a vector address identifying a different one of said plurality of emulation subroutines; and, a bidirectional bus interconnecting said microprocessor and emulation chip stages for transferring information according to a standard protocol, said emulation instruction unit during a first phase of operation, decoding each source instruction fetched from said instruction cache and in accordance with said decoding causing said control store to read out said vector address for transfer to said microprocessor chip stage using said standard protocol and during a second phase of operation, said microprocessor chip stage fetching said vector address previously transferred to said microprocessor chip stage during said first phase and executing maid RISC type of instructions of a specified one of said emulation subroutines designated by said vector address, said microprocessor chip stage having:

branch vector apparatus connected to said bidirectional bus, said branch vector apparatus including a branch vector register connected to said bus for receiving and storing said each vector address, read and write indicator means for storing signals received from said microprocessor and emulation chip stages for indicating when said branch vector register has been accessed and updated respectively, output means for generating an external signal on said bus signaling each time said microprocessor chip stage accesses said each vector address to fetch one of said emulation subroutines from said instruction cache, and means for connecting said read indicator means to said output means for causing said output means to generate said external signal on said bus each time said read indicator means is set to an active state; and, a branch vector instruction facility for testing said write indicator means for determining when said write indicator means has been set to said active state by said branch vector instruction for enabling said microprocessor chip stage to fetch said next emulation subroutine from said instruction cache so that the execution of said RISC type of instructions by said microprocessor stage overlaps said emulation chip stage decoding of a next source instruction, said read out of said vector address and said transfer of said vector address to said microprocessor chip stage thereby enabling execution of source instructions in a two-stage overlapped pipelined mode of operation.

16. The emulator of claim 15 wherein said emulation chip further includes a subroutine and control store sequencer coupled to said subroutine address control store and instruction decode unit, said instruction decode unit in response to fetching and decoding said each source instruction, generating a starting address for accessing said subroutine address control store, said subroutine control store having a plurality of addressable storage locations for storing microinstructions for controlling emulation chip operations, each of a number of said microinstructions containing said vector address for specifying a starting address of said different one of said plurality of emulation subroutines and said control store being connected to said bus, said control store in response to said starting address reading out a specified one of said number of said microinstructions for applying one of said number of vector addresses to said bus for transfer to said microprocessor chip using said standard protocol.

17. The emulator of claim 16 wherein said subroutine and control store sequencer is connected to receive said external signal from said output means of said microprocessor chip, said sequencer in response to each external signal advancing said subroutine address control store to access a microinstruction for reading out another one of said number of said microinstructions for generating a next one of said number of vector addresses for transfer to said microprocessor chip during said first phase of operation.

18. The emulator of claim 17 wherein said number of said microinstructions include vector addresses for specifying emulation subroutines for performing address development and execution phases of operation required for emulating execution of source instructions by said general purpose computer.

19. A method of operating an emulator having first and second pipelined stages for executing source instructions executable by a general purpose computer in a highly efficient manner, said method comprising the steps of:

(a) fetching, decoding and generating a branch vector address by an emulator chip of said first pipeline stage of said emulator for each source instruction fetched from an instruction cache coupled to said first pipeline stage during a first phase of operation;

(b) transferring the branch vector address during said first phase of operation for storage in a microprocessor chip of said second pipeline stage of said emulator through a bidirectional bus interconnecting said chips, the transfer of said branch vector address occurring as soon as storage is made available; and, (c) fetching and executing RISC instructions of one of a plurality of emulation subroutines stored in an on-chip instruction cache of said microprocessor chip specified by the branch vector address transferred during step (b) during a second phase of operation, for executing a next source instruction following completion of the previous source instruction in parallel with the operations of steps (a) and (b) thereby enabling said first and second stages of said emulator to execute each said source instruction in a highly overlapped pipelined fashion.

20. The method of claim 19 wherein step c further includes the step of executing a plurality of reduced instruction set (RISC) instructions of said one of said plurality of emulation subroutines for emulating said general purpose computer in executing said each source instruction.

* * * * *